US011194785B2

(12) United States Patent
Liang et al.

(10) Patent No.: US 11,194,785 B2
(45) Date of Patent: Dec. 7, 2021

(54) UNIVERSAL SELF-LEARNING DATABASE RECOVERY

(71) Applicant: INTERNATIONAL BUSINESS MACHINES CORPORATION, Armonk, NY (US)

(72) Inventors: Ping Liang, Beijing (CN); Yu He, Beijing (CN); Xue Bin Cong, Beijing (CN); Xiao Feng Meng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 16/540,254

(22) Filed: Aug. 14, 2019

(65) Prior Publication Data
US 2021/0049144 A1     Feb. 18, 2021

(51) Int. Cl.
| G06F 7/00 | (2006.01) |
| G06F 16/23 | (2019.01) |
| G06N 20/00 | (2019.01) |
| G06F 11/14 | (2006.01) |

(52) U.S. Cl.
CPC ...... *G06F 16/2365* (2019.01); *G06F 11/1469* (2013.01); *G06N 20/00* (2019.01); *G06F 2201/82* (2013.01)

(58) Field of Classification Search
CPC ............ G06F 16/2365; G06F 11/1469; G06F 2201/82; G06N 20/00
USPC ................................................ 707/600–899
See application file for complete search history.

(56) References Cited

U.S. PATENT DOCUMENTS

| 9,116,952 B1 * | 8/2015 | Heiler ............... G06F 16/90328 |
| 2018/0157978 A1 | 6/2018 | Buda | |

FOREIGN PATENT DOCUMENTS

| CN | 109344201 A | 2/2019 |
| WO | 20151483281 W | 10/2015 |

OTHER PUBLICATIONS

Mell, Peter et al.; "The NIST Definition of Cloud Computing;" National Institute of Standards and Technology; Special Publication 800-145; Sep. 2011; 7 pages.

* cited by examiner

*Primary Examiner* — Isaac M Woo
(74) *Attorney, Agent, or Firm* — Schmeiser, Olsen & Watts; Stephanie Carusillo

(57) ABSTRACT

A self-learning, self-healing database-management system determines that erroneous input, such as an improper SQL query, has caused a critical database condition. The system parses each input statement into a set of tokens, and then translates each set into lines of a failure script. The script is consolidated by cross-referencing each line to infer relationships between input statements. The system then searches historical database logs for previously entered, error-free input similar to the erroneous input. A degree of similarity between the erroneous input and each previously entered input is determined by a computational method that quantifies similarities between the failure script and each script generated from a previously entered input. The system revises the erroneous input to more closely match the most-similar previously entered input and resubmits the corrected input. The results of the resubmission are used to train the system to more accurately correct future input errors.

20 Claims, 7 Drawing Sheets

```
SELECT  '{F04}' AS "Abfragename", '01.01.2018' AS "Bestand vom",
      '19.02.2018' AS "ZR-VON", '23.02.2018' AS "ZR-BIS", PE.
      PERSONEN_NR AS "PERS-NR", PE.NAME !! ' ' !! PE.VORNAME !! ' '
      !! PE.NAMENSERW AS "NAME, VORNAME", PE.PERS_ART AS
      "PERS-ART", 'Geeignetheitserkl?rung' AS "Bedeutung", DDA.DOK_TYP_NR AS
      "DOK-TYP", CASE
         WHEN   DDA.DOK_TYP_NR = 869 THEN 'WPHG-Beratungsprotokoll'
         WHEN   DDA.DOK_TYP_NR = 1251 THEN
            'Beratungsstrategie Beratungsprozess'
         END AS "Zweck", DDA.ARCHIV_DATUM AS "ARCHIV-DAT"
   FROM    S015BIL.DOK_BEZIEHUNG DBE
      JOIN  S015BIL.DOK_DATEN DDA
         ON   DBE.DOK_ID_HOST = DDA.DOK_ID_HOST
         AND  DBE.OBJEKT_TYP = 20
      JOIN  S015BIL.T_PERSON PE
         ON   DBE.OBJEKT_ID = PE.PERS_NR
      WHERE   UPPER(PE.NAME) NOT LIKE '%TESTKUNDE%'
         AND  PE.LOESCH_KZ_PERS = ''
         AND  PE.PERS_ART IN('N', 'P', 'G', 'J') AND  DDA.DOK_TYP_NR IN(869,
         1251)
         AND  DDA.DOK_STATUS = 'A'
         AND  DDA.ARCHIV_DATUM BETWEEN '19.02.2018'
         AND '23.02.2018'
SELECT  'Geeignetheitserkl?rung' AS "Bedeutung", DDA.DOK_TYP_NR AS
      "DOK-TYP",
      CASE
         WHEN   DDA.DOK_TYP_NR = 869 THEN 'WPHG-Beratungsprotokoll'
         WHEN   DDA.DOK_TYP_NR = 1251 THEN
            'Beratungsstrategie Beratungsprozess'
         END AS "Zweck", DDA.ARCHIV_DATUM AS "ARCHIV-DAT", dbe.*, dba.*
      FROM    S015BIL.DOK_BEZIEHUNG DBE
      JOIN  S015BIL.DOK_DATEN DDA
         ON   DBE.DOK_ID_HOST = DDA.DOK_ID_HOST
      WHERE  DDA.DOK_STATUS = 'A'
         AND  DDA.ARCHIV_DATUM BETWEEN '19.02.2018' AND '23.02.2018'
```

FIG. 4

UNIVERSAL SELF-LEARNING DATABASE RECOVERY

BACKGROUND

The present invention relates in general to database management systems (DBMSs) and in particular to a DBMS's ability to recover from a critical condition.

DBMS applications routinely receive Structured Query Language (SQL) queries, scripts of database instructions, and other types of input statements that request services from the DBMS. If an input statement contains an error, is inefficiently coded, or makes an unexpected request, the statement may drive all or part of the DBMS into a critical condition. Critical conditions can range from a simple query failure to a single-user error lockup, local or global performance degradation, or a system-wide outage.

Certain DBMS applications validate and interpret an input statement by parsing elements of the statement into tokens that each represent an operator, parameter, database element, or other element of the statement. This parsing is performed by traversing a treelike logical structure that progressively narrows the DBMS's identification of each token.

Although parsing can efficiently decompose an input statement into meaningful elements, parsing alone does not identify which tokens of an input statement are responsible for a critical condition when the statement triggers such a condition.

SUMMARY

Embodiments of the present invention comprise systems, methods, and computer program products for a self-learning, self-healing database-management system. If determining that erroneous input, such as an improper SQL query, has triggered a critical database condition, the system parses each statement of the erroneous input into a set of tokens, and then translates each set into lines of a failure script. The script is consolidated by cross-referencing each line to infer relationships between input statements, and then using those inferences to add information that could not be directly extracted from the erroneous input by a parsing procedure. The system then searches historical database logs for previously entered, error-free input similar to the erroneous input. A degree of similarity between the erroneous input and each previously entered input is determined by a computational method, such as K-mean clustering, that quantifies similarities between the failure script and scripts generated from the previously entered inputs. The system compares the erroneous input to the previously stored input that is most similar to the erroneous input in order to identify relevant differences between the two inputs. The system then revises the erroneous input to more resolve at least some of the differences and resubmits the corrected input, either with or without authorization from a third party. The results of the resubmission are used to train the system to more accurately identify and correct future input errors.

BRIEF DESCRIPTION OF THE DRAWINGS

FIG. 4 is an example of SQL input that may be submitted to a DBMS application.

DETAILED DESCRIPTION

Figure 1:
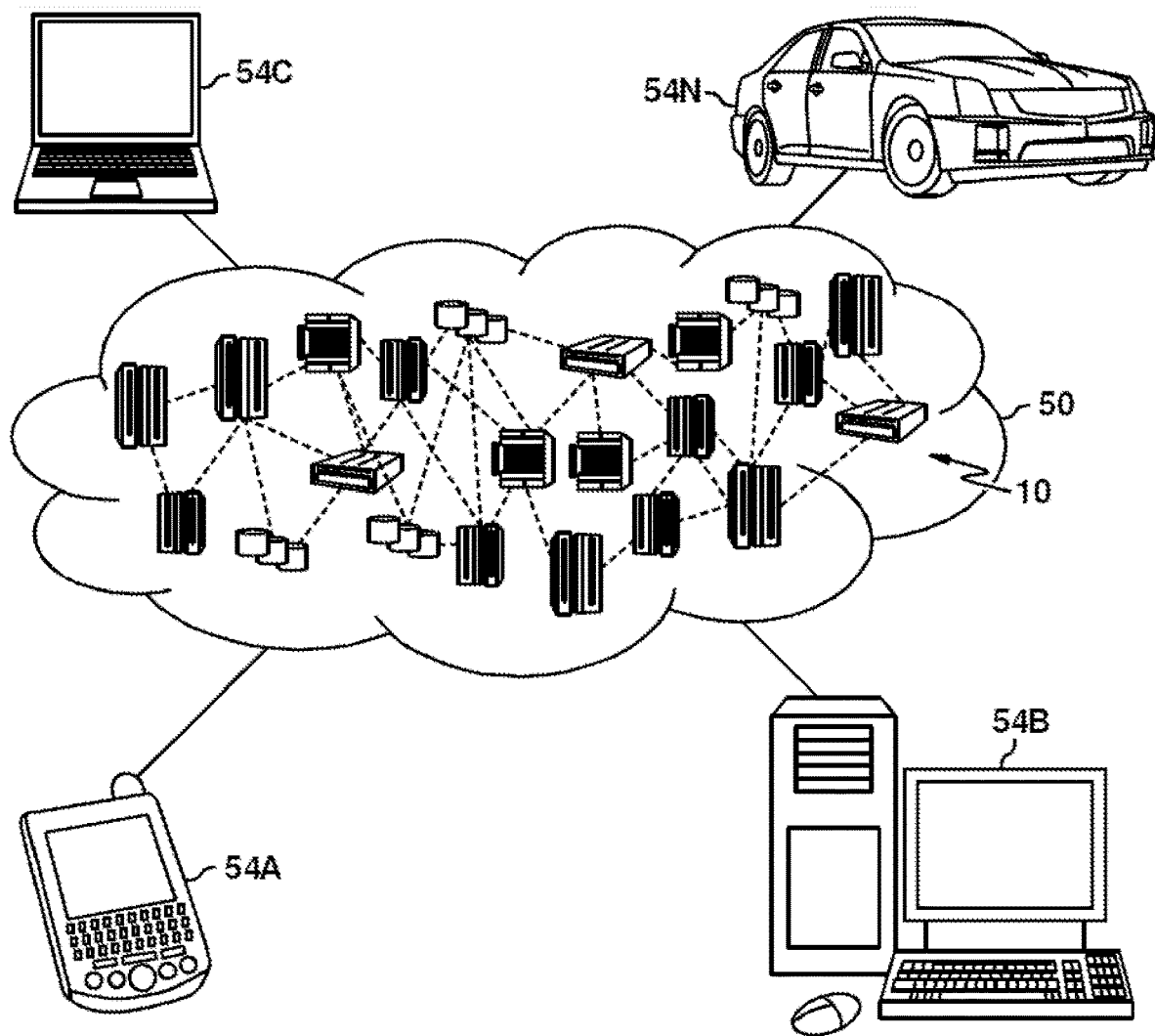
FIG. 1 depicts a cloud computing environment according to an embodiment of the present invention.

Embodiments of the present invention improve current DBMS technology by using methods of machine learning and cognitive analytics to intelligently identify which elements of an input query, script, or other instructions received by a DBMS application are responsible for driving the DBMS into a critical condition. Such improved database management systems then use cognitive technologies to revise the input into a version less likely to trigger the critical condition. The resulting revised input is then either automatically run without user intervention or is submitted to a user who may authorize the revised input for resubmission.

Another benefit of the present invention is that it may be applied "universally" to any known database-management technology or data-accessing system. In other words, the present invention is flexible enough to be applied to a "universal" selection of data repositories and data-access and database systems.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
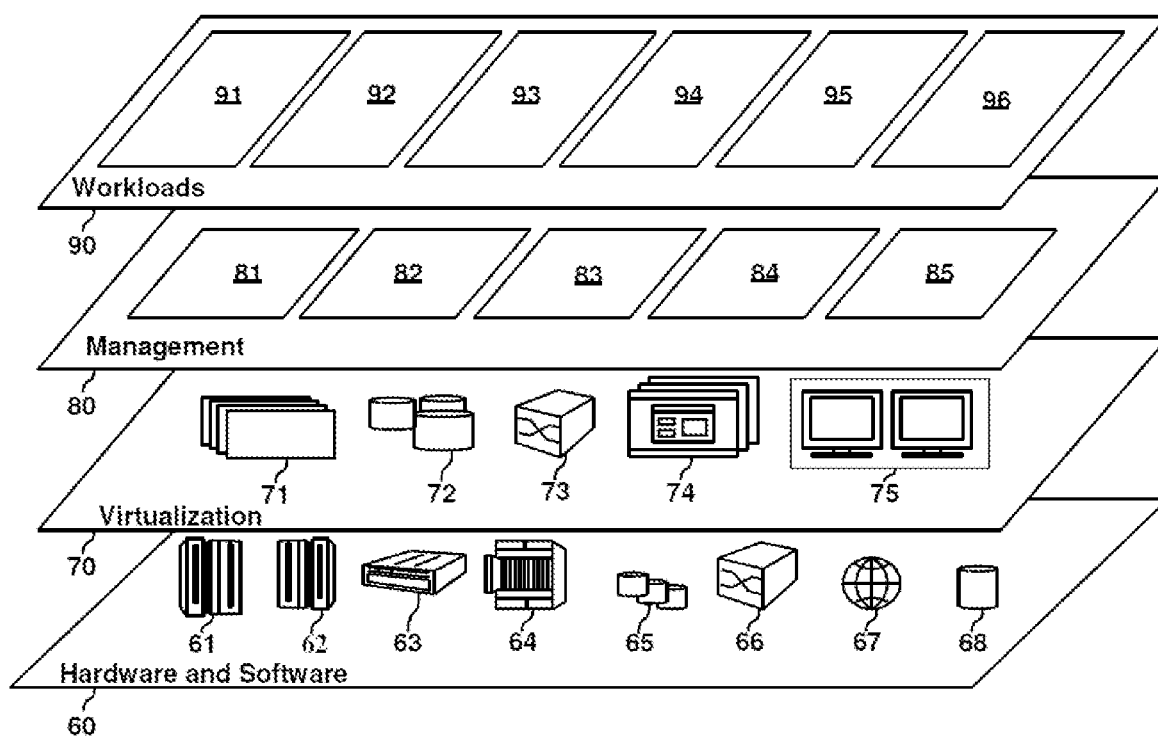
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration of methods, systems, and computer program products for self-learning universal database recovery 96.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
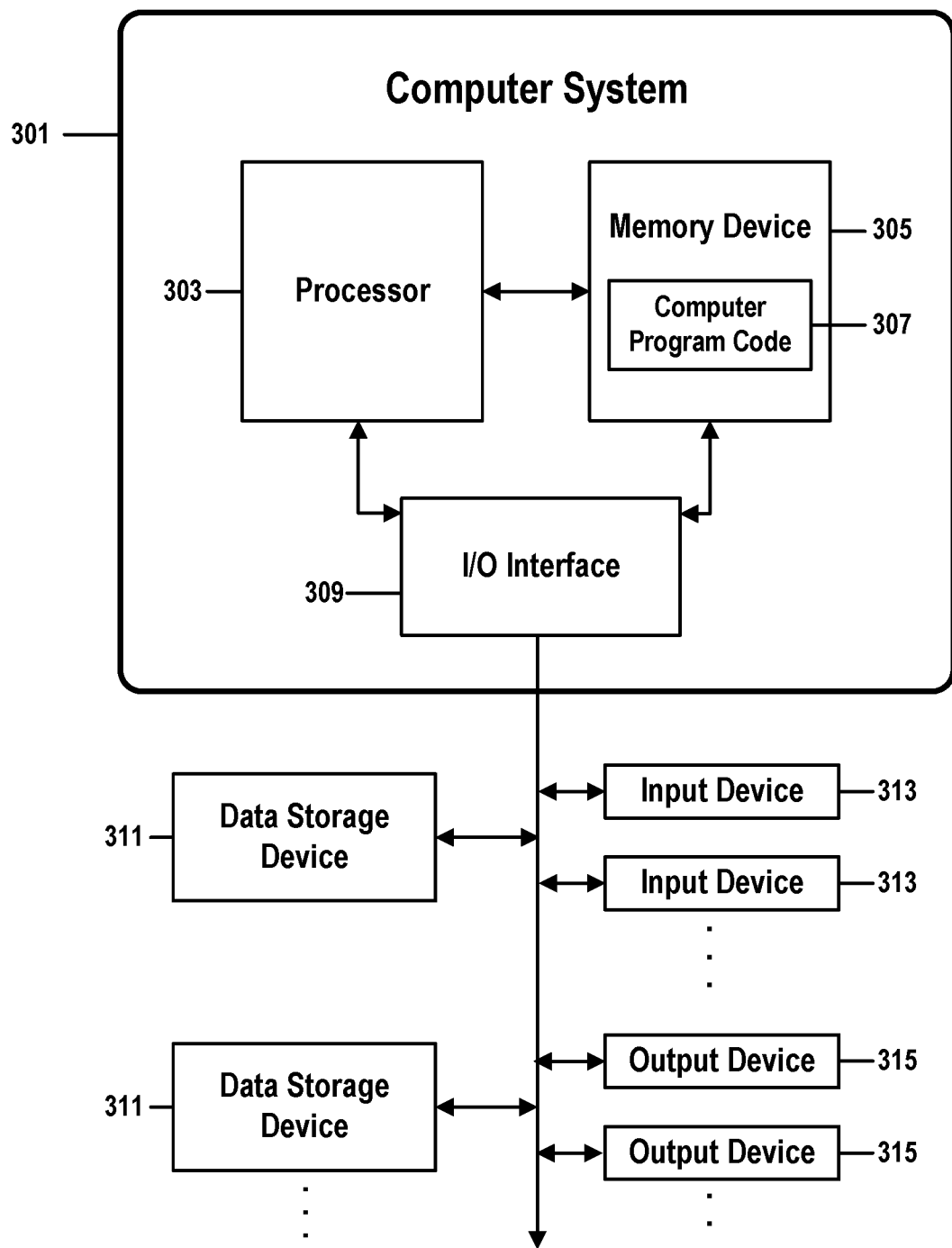
FIG. 3 shows a computer system and computer program code that may be used to implement a method for self-learning database recovery in accordance with embodiments of the present invention.

FIG. 3 shows a structure of a computer system and computer program code that may be used to implement a method for self-learning database recovery in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for self-learning database recovery in accordance with embodiments of the present invention, and may implement other embodiments described in this specification, including the methods illustrated in FIGS. 1-7. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware, or may be accessed by processor 303 directly from such firmware, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for self-learning database recovery.

Any of the components of the present invention could be created, integrated, hosted, maintained, deployed, managed, serviced, supported, etc. by a service provider who offers to facilitate a method for self-learning database recovery. Thus the present invention discloses a process for deploying or integrating computing infrastructure, comprising integrating computer-readable code into the computer system 301, wherein the code in combination with the computer system 301 is capable of performing a method for self-learning database recovery.

One or more data storage devices 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 307 for a method for self-learning database recovery may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for self-learning database recovery is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

FIG. 4 is an example of SQL input that may be submitted to a DBMS application. This figure is intended to show how complex such input 400 can be, and how difficult it can be to automatically identify and correct errors in such complex input 400. FIG. 4 shows items 400-410.

As can be seen in the figure, a query or script submitted to a database system may be complex and lengthy, containing numerous statements and logical structures, and sometimes even being formatted in an unexpected manner. When such a query drives the DBMS into a critical condition, identifying the source of the problem generally requires intervention by a human database administrator.

For example, in the example of FIG. 4, when an SQL query input 400 is submitted to a DBMS application, the DBMS application is thrown into a critical state. This occurs because input 400 contains so-called "splash-notation" asterisks, which are not supported by SQL, at location 410 of input 400. Known DBMS applications have no way to identify such an error. In this example, a human administrator or technician would be forced to manually determine that input 400 is the cause of the critical state and to then manually analyze query 400 in order to track down the error at location 410. The human worker would then have to manually correct the error or return query 400 to its originator for manual correction before resubmitting the corrected input.

Embodiments of the present invention improve known database applications by providing a way for an improved application to automatically determine which previously submitted input statements have triggered a DBMS's critical condition, identify and characterize elements of the offending statements responsible for the problem, generate a corrected version of the offending input, and resubmit the corrected input to the DBMS.

Figure 5:
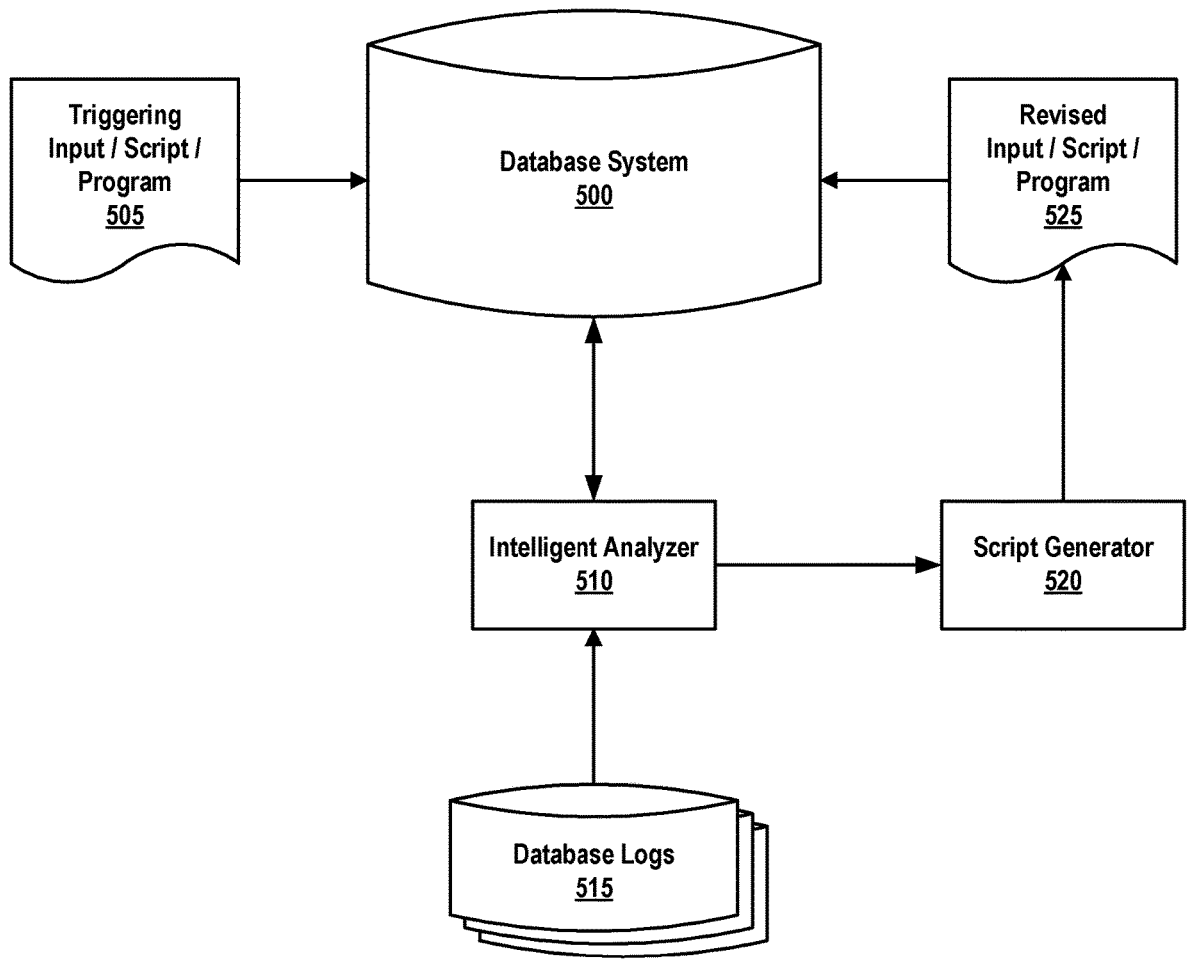
FIG. 5 shows a structure of an improved DBMS application and adjacent elements in accordance with embodiments of the present invention.

FIG. 5 shows a structure of an improved DBMS application and adjacent elements in accordance with embodiments of the present invention. FIG. 5 contains items 500-525.

Here, improved DBMS application or database system 500 receives instructions in input 505, which may contain any sort of statements capable of directing DBMS 500 to perform a database-related operation. Such operations may, for example, comprise retrieving a single data element from a database table, retrieving a set of complex data elements each formed by joining elements of multiple database tables, adding data to a database, or deleting data from a database. Input 505 could, for example, comprise an SQL query, a set of system calls or service requests, a script generated by another application, or an instruction manually entered by a user through an interactive interface.

Examples and embodiments described in this document generally present input 505 as an SQL database query. These examples and embodiments should not be construed to imply that the present invention can only be used with SQL input. The present invention is flexible enough to accommodate any sort of input format or mechanism supported by a database system 500, including the types of input 505 described above.

When the main component of database system 500 experiences a critical condition, intelligent analyzer 510, using archival transaction histories or other information stored in database logs 515, determines which previously submitted input 505 has triggered the critical condition and identifies the specific elements of offending input 505 responsible for the error. In certain embodiments, intelligent analyzer 510 performs these tasks through technologies and methods of artificial intelligence, such as cognitive analytics. Script generator 520 then uses the information produced by intelligent analyzer 510 to revise input 505 and to then resubmit a corrected version 525 of input 505 to database system 500. In some embodiments, script generator 520 first submits the corrected version 525 to a human user or administrator.

Certain embodiments comprise a variation of improved database system 500, in which analyzer 510, script generator 520, or database logs 515 are integrated into database system 500, rather than being configured as distinct modules external to system 500. Such structural differences do not affect the aggregate functionality or novelty of the embodiment, and are merely a byproduct of implementation-specific technical or cost requirements.

Figure 6:
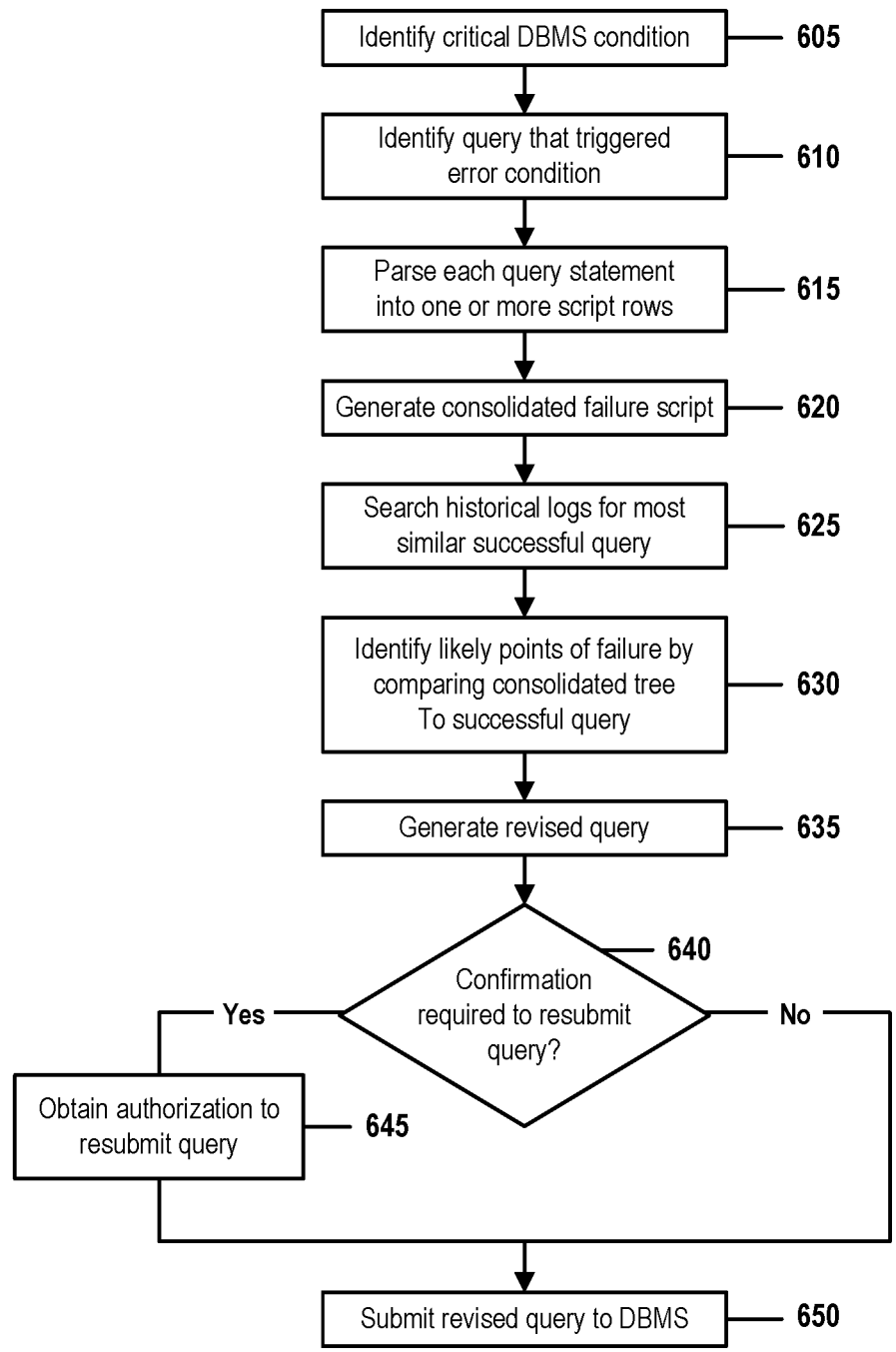
FIG. 6 is a flow chart that illustrates a method for self-learning database recovery in accordance with embodiments of the present invention.

FIG. 6 is a flow chart that illustrates a method for self-learning database recovery in accordance with embodiments of the present invention. FIG. 6 shows steps 605-650.

In step 605, a critical condition is detected by a component of improved database system 500, or by a component of a related system that monitors the performance of database system 500. The critical condition may comprise any combination of undesired states or conditions of database system 500, such as a performance degradation, a data loss, or a user's inability to access a data repository. The detection is communicated to intelligent analyzer 510, which, depending on implementation details, may be configured as a component of database system 500 or as a component of a system related to database system 500.

In step 610, intelligent analyzer 510 determines that the critical condition is likely to have been triggered by the submission of input 505. This determination may be performed by any means known in the art. For example, input 505 may be identified as the offending input because input 505 was submitted at the approximate time at which the critical condition occurred, or because input 505 was submitted through the user device that is known to have caused the critical condition or that is directly affected by the critical condition.

Figure 7:
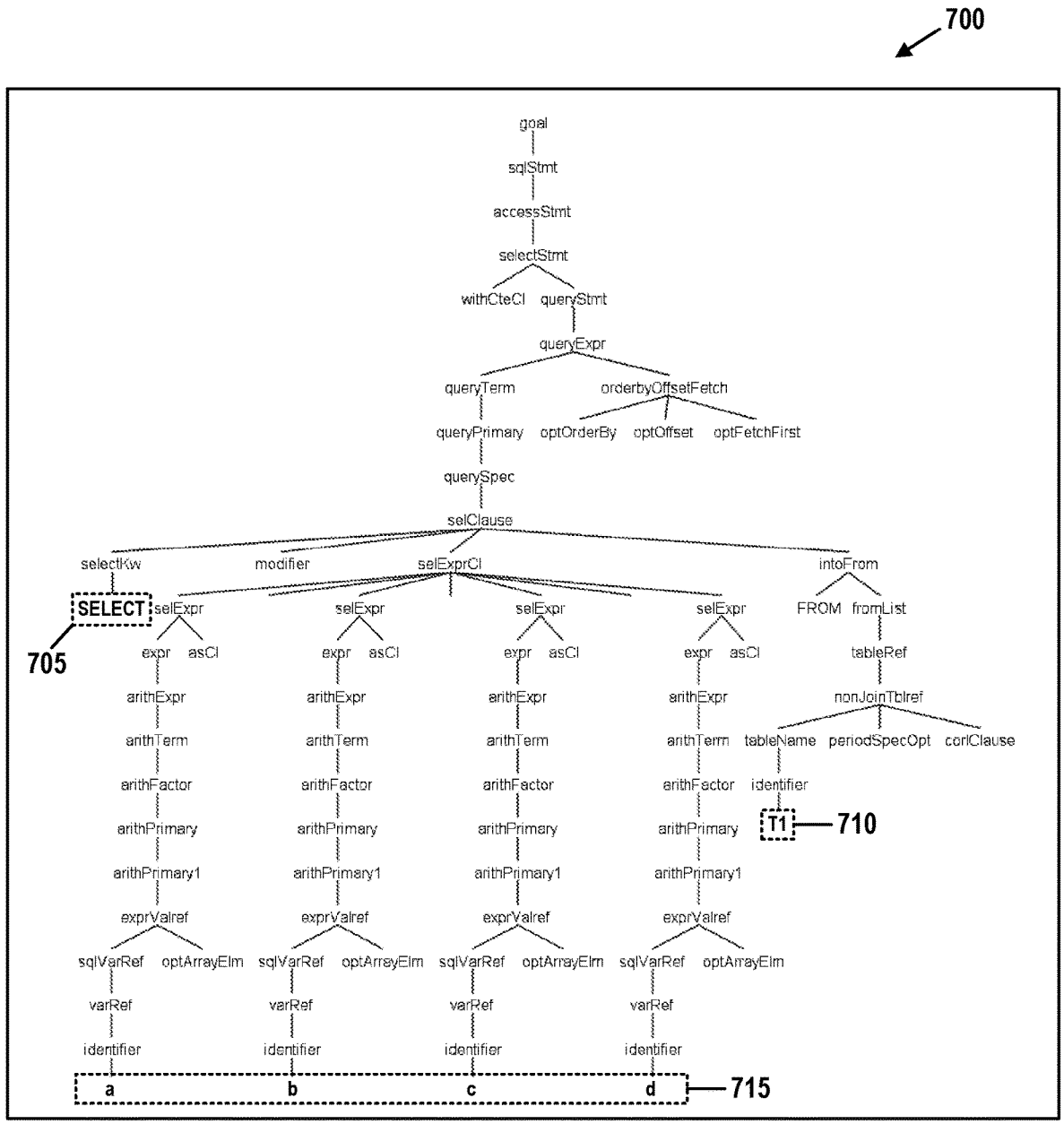
FIG. 7 is an example of a skeleton tree that is generated internally by a DBMS application when parsing an input statement.

In step 615, intelligent analyzer 510 parses each statement of offending input 505 through a logical procedure represented in this document as a "skeleton tree." As described below, FIG. 7 is an example of such a tree.

This parsing procedure decomposes the input statement into tokens that each represent a key node of the input statement. Each key node is an element of the input statement that characterizes the operation performed by the input statement or that characterizes an entity upon which the operation is performed. Each traversal through a skeleton tree further refines the categorization of the element being parsed by the traversal. When an element arrives at a leaf of the skeleton tree, that element is considered to be a primitive "token" comprised by the input statement that cannot be further decomposed or more finely categorized.

This document does not describe this parsing/tokenization procedure in greater detail because the basic method of parsing an input statement into tokens by traversing a hierarchical tree is a procedure used in existing programming-language compilers and interpreters, interactive user interfaces, and other applications that must convert input statements into a form that can be processed by a finite-state machine, natural-language processing interface, or other type of input-processing application. Embodiments of the present invention incorporate this parsing mechanism into a novel procedure that translates statements of input 505 into rows of a "failure script" that can be compared in a particular manner to previously submitted input recorded in database logs 515.

FIG. 7 is an example of a skeleton-tree-based parsing procedure and is intended solely to illustrate the general procedure by which a DBMS application's front end internally might parse a common type of input statement into tokens that the application can understand. In this example, the DBMS application parses a statement of an SQL query submitted as input 505 to the DBMS application. FIG. 7 contains items 700-715.

Here, a skeleton tree 700 is a directed tree comprising logical paths through which an input statement SELECT A, B, C, D FROM T1 can be parsed. Each node represents a categorization of a data element arriving at that node, and each node's associated category narrows the category associated with that node's parent node. Each time a component of the input statement is passed to a next node down a path of the tree, either that component is decomposed into two or more sub-components, each of which then begins to traverse a new branch, or the component's category is further refined to a narrower subcategory.

Each component of the input statement completes its traversal through the tree when it reaches a leaf node that characterizes a fundamental token comprised by the parsed statement. At that point, the token cannot be decomposed into more granular subcomponents and cannot be categorized with greater specificity. In the example of FIG. 7, the input statement is parsed in this manner into six tokens, each of which is identified at a leaf of skeleton tree 700: the input statement's SELECT operator 705, the table T1 operand of the SELECT operator, and the four columns of table T1, a, b, c, and d 715.

Returning to step 615 of FIG. 6, input analyzer 510 uses a mechanism similar to that explained above to parse each statement, or each distinct logical instruction, of input 505 into tokens. Input analyzer 510 then performs additional procedures that translate each statement's extracted tokens into one or more rows of a failure script. The failure script may be formatted in any manner preferred by an implementer, but in all cases, each row will list a statement's "key nodes." Key nodes may be any elements of the statement needed to allow analyzer 510 to compare the statement to previous input statements stored in database logs 515.

For example, in FIG. 7, the tokens derived by parsing the exemplary SELECT statement may be translated into a row of a failure script that identifies the following key nodes of the statement:

i) a database table that is accessed by the statement, ii) an operator "verb" that describes an operation to be performed by the statement on the database table, iii) the columns of the table that are operated upon by the verb, and iv) the data formats of each of the columns.

Continuing the example of FIG. 7, if intelligent analyzer 510 parses the SELECT statement by traversing tree 700, this parsing could result in analyzer 510 generating a row of the form:

| Table | Verb | Col 1 | Col 2 | Col 3 | Col 4 |
|---|---|---|---|---|---|
| T1 | SELECT | INT a | VARCHAR(20) b | VARCHAR(20) c | VARCHAR(20) d |

In some embodiments, the number of columns or the content of each column in a row of the failure script might vary as a function of that row's operator verb or as a function of which database table is identified by that row. For example, an SQL statement of a type capable of specifying two clauses might be represented by a failure-script row that has a "VERB1" and a "VERB2" column or might be represented by two rows, each of which is associated with one of the two operators. In another example, a statement comprising an operator that can specify an arbitrary number of columns in a single table might be translated into a failure-table row configured to be capable of storing a value of every column of the single table.

If input 505 is not an SQL-compliant query, each row of the failure script is configured to store key nodes associated with tokens generated by parsing one statements of non-SQL input 505. The present invention is flexible enough to accommodate any type of non-SQL statements and any corresponding row configuration desired by an implementer, so long as the configuration allows analyzer 510 to compare key nodes represented by a failure script to key nodes of previously submitted input recorded in database logs 515.

At the conclusion of step 515, intelligent analyzer 510 will have formatted each set of key nodes extracted from a statement of input 505 into a set of one or more rows of a failure script. Each set of one or more rows:

will have been generated by a parsing procedure identified by a corresponding skeleton tree;

characterizes the operations performed by a corresponding statement of input 505 and the entities upon which the corresponding statement attempts to perform those operations; and is formatted in a manner that allows key nodes derived from the corresponding statement to be readily compared to key nodes of statements comprised by previously submitted input.

In step 620, intelligent analyzer 610 consolidates the sets of one or more rows into a consolidated failure script that accounts for dependencies and relationships among key nodes of statements comprised by input 505.

This consolidation may be performed by any means known in the art, such as through artificially intelligent cognitive analytics or through other types of inferential processes. For example, if a first statement of input 505 is parsed into tokens from which intelligent analyzer 610 assembles a first row:

| Table | Verb   | Col 1 | Col 2 | Col 3       |
|-------|--------|-------|-------|-------------|
| T1    | SELECT | INT w | x     | VARCHAR(5) z | and a second statement of input 505 is parsed into tokens from which intelligent analyzer 610 assembles a second row:

| Table | Verb | Col 1 | Col 2 | Col 3 |
|-------|------|-------|-------|-------|
| T1    | JOIN | w     | int x | z     |

In this example, intelligent analyzer 510 was unable in step 615 to identify the data formats of each referenced column of table T1 from either the first statement or the second statement alone. In step 620, analyzer 510 rectifies this problem by cross-referencing the two rows to infer that columns w and x contain data elements of type INT, and column z stores data of type VARCHAR(5). Intelligent analyzer 510 would then use these inferences to consolidate the references to table T1 in those two rows, resulting in updated rows:

| Table | Verb   | Col 1 | Col 2 | Col 3        |
|-------|--------|-------|-------|--------------|
| T1    | SELECT | INT w | int x | VARCHAR(5) z |
| T1    | JOIN   | INT w | int x | VARCHAR(5) z |

This procedure is repeated for each set of one or more rows generated by parsing a statement of input 505 through a corresponding skeleton tree of the skeleton forest. The present invention is are flexible enough to accommodate any sort of inferences, cognitive or artificially intelligent methodologies, logic, or consolidation methods preferred by an implementer.

At the conclusion of step 620, intelligent analyzer 510 will have generated a complete failure script consisting of sets of one or more consolidated rows. Each of these sets represents key nodes (that is, operations and operands upon which the operations are performed) of one statement of input 505. The sets will have been consolidated by cross-referencing information in each set, such that each represented key node is characterized as accurately and as completely as possible, based on information comprised by input 505 in its entirety.

In step 625, intelligent analyzer 510 searches through database logs 515 to find input previously submitted to database system 500 that is most like currently failing input 505. This search may be performed by any procedure known in the art, such as through SQL queries into a database that stores logs 515, through a text-matching or pattern-matching search engine, through any known fuzzy-logic-type search method, or through a proprietary search mechanism adapted to retrieve data from the repository that stores database logs 515.

Intelligent analyzer 510 can attempt to retrieve candidate inputs by using any sort of search criteria deemed by an implementer to be relevant. Intelligent analyzer 510 could, for example, search for similar inputs by submitting fuzzy or non-fuzzy search terms associated with parameters that had been deemed to be key nodes in step 615. In other embodiments, analyzer 510 might deem a previously submitted input to be similar to input 505 if the two specify a certain combination of same object names, object types, logical structures (such as certain types of loop or conditional statements), orders or sequences of particular statements, operator parameters, or running environments.

Some embodiments may have stored previously submitted input in a tabular format like that of the failure script. If not, intelligent analyzer 510, in order to compare each previously submitted input to the failure script derived from current input 505, would subject each previously submitted input to a skeleton-tree-based procedure similar to that of steps 615 and 620. In this way, intelligent analyzer 510 would a similar script for each previously submitted candidate input stored in database logs 515, allowing analyzer 510 to directly compare keywords of each previously submitted input to keywords of the current input 505.

Once each previously submitted input has been translated into a table formatted in a manner that allows the table to be directly compared to the failure table, any type of similarity measuring technique or algorithm may be used to determine which previously submitted input is most similar to current input 505. For example, K-means clustering, a type of vector-quantization algorithm used in applications like data mining, may be used to determine a degree of similarity between two matrices or tables. In other cases, other types of known statistical methods may also be used to determine a relative similarity "distance" between each pair of tables, where the distance is measured in a multidimensional space in which bases are associated with some or all of the search terms used to select similar inputs.

In one example, intelligent analyzer 510, after parsing an input 505 by means of the skeleton-tree procedure described above, translates the resulting key node output into the following consolidated failure script:

| Stmt# | Verb   | Table | Col A   | Col B      | Col C    |
|-------|--------|-------|---------|------------|----------|
| 1921  | DROP   | T2    |         |            |          |
| 1922  | LOAD   | T3    |         |            |          |
| 1923  | CREATE | T6    | FLOAT c | INT d      |          |
| 1924  | CREATE | T2    | INT e   | CHAR(10) f | CHAR(5) e |
| 1925  | LOAD   | T4    |         |            |          |
| 1926  | DROP   | T3    |         |            |          |
| 1927  | SELECT | T2    | INT e   |            |          |
| 1928  | UNLOAD | T7    |         |            |          |
| 1929  | INSERT | T4    | INT h   | BIGINT i   |          |
| 1930  | DROP   | T6    |         |            |          |
| 1931  | UNLOAD | T7    |         |            |          |
| 1932  | REPAIR | T3    |         |            |          |
| 1933  | SELECT | T2    | INT e   | VARCHAR(20) f |       |

Intelligent analyzer 510 might, in this example, attempt to simplify the search by partitioning a lengthy failure script into a set of sub-scripts that each consist of rows that refer to only one of the five database tables referenced by the failure script. This would allow intelligent analyzer 510 to run five much simpler searches that each search for input that performs a sequence of operations on a single table that has a high degree of similarity to the sequence of operations represented by one of the sub-scripts. The five smaller failure scripts, each of which represents operations performed on a single table would consist of:

| Stmt# | Verb | Table | Col A | Col B | Col C |
|---|---|---|---|---|---|
| 1921 | DROP | T2 | | | |
| 1924 | CREATE | T2 | INT e | CHAR(10) f | CHAR(5) e |
| 1927 | SELECT | T2 | INT e | | |
| 1933 | SELECT | T2 | INT e | VARCHAR(20) f | |

| Stmt# | Verb | Table | Col A | Col B | Col C |
|---|---|---|---|---|---|
| 1922 | LOAD | T3 | | | |
| 1926 | DROP | T3 | | | |
| 1932 | REPAIR | T3 | | | |

| Stmt# | Verb | Table | Col A | Col B | Col C |
|---|---|---|---|---|---|
| 1925 | LOAD | T4 | | | |
| 1929 | INSERT | T4 | INT h | BIGINT i | |

| Stmt# | Verb | Table | Col A | Col B | Col C |
|---|---|---|---|---|---|
| 1923 | CREATE | T6 | FLOAT c | INT d | |
| 1930 | DROP | T6 | | | |

| Stmt# | Verb | Table | Col A | Col B | Col C |
|---|---|---|---|---|---|
| 1928 | UNLOAD | T7 | | | |
| 1931 | UNLOAD | T7 | | | |

In this example, a repository of database logs 515 contains a set of tables derived from input previously submitted to database system 500 without triggering a critical condition. In addition to numerous tables that bear little similarity to any of the failure sub-script tables, the stored set of tables might include the "similar" script:

| Stmt# | Verb | Table | Col A | Col B | Col C |
|---|---|---|---|---|---|
| 1 | DROP | T1 | | | |
| 2 | CREATE | T1 | INT a | CHAR(20) b | |
| 3 | SELECT | T1 | INT a | | |
| 4 | ALTER TABLE | T1 | | VARCHAR(20) b | |
| 5 | SELECT | T1 | INT a | VARCHAR(20) b | |

This similar script is not identical to the failure script or to any of the failure sub-scripts. However, a K-means clustering algorithm or other similarity-quantification mechanism might find the similar script to have a greater degree of similarity to the T2 sub-script than does any other script or input stored in database logs 515. Here, although the similar script refers to a table T1 that is distinct from the sub-script's table T2, significant similarities exist between the T2 sub-script and the T1 script.

All four of the T2 sub-script's verbs match those of analogous statements of the T1 script and both scripts list those four verbs in the same order. The Col A column of each pair of corresponding rows refers to an identical entity (either an INT data item or a null field). Although the T1 script's Col 2 column values do not exactly match those of the four corresponding rows of the T2 sub-script, three out of the four pairs of values are at least similar in that they identify types of character data. Furthermore, although one pair of the two scripts' corresponding Col C values is a mismatch, both tables contain identical null entries in the other three corresponding row pairs.

In this example, intelligent analyzer 510 would identify that, due to these numerous similarities, the K-means clustering algorithm identifies a degree of similarity between the T2 sub-script and the similar T1 script that exceeds a predetermined threshold similarity value, or that is greater than a degree of similarity between the T2 sub-script and any other script stored as a database log 515. In response, intelligent analyzer 510 would then select the previously submitted input represented by the T1 script as the model upon which to select corrections to failed input 505.

An implementer may choose other methods of selecting a most-similar input from the previously submitted inputs stored as database logs 515, depending on technical, performance, or business requirements or on the implementer's expert knowledge of the relative importance of each input parameter.

For example, other criteria may be used to decide how to divide a failure script into sub-scripts, or a failure script may not be divided at all, requiring intelligent analyzer 515 to search for stored scripts that are similar in their entirety of the entire failure script. Other embodiments may select a most-similar input only after analyzing, averaging, or aggregating results of multiple similarity analyses, each of which may be based on a distinct statistical, artificially intelligent, analytic, or other type of algorithm.

In step 630 the failure script and the selected most-similar script are compared in order to identify differences most likely to explain why input 505, represented by the failure script, triggered the critical condition, while the previously submitted input represented by the selected most-similar script ran without incident. If this step is performed by intelligent analyzer 510, the identified differences are then forwarded to script generator 520 for further processing in step 535. In certain embodiments, intelligent analyzer 515 instead forwards the failure script and the selected most-similar script to script generator 520 at the conclusion of step 625, allowing script generator 520 to perform step 630. An implementation-dependent choice of which module performs the operations of step 630, does not alter the functionality of step 630, as described below.

Step 630 may be performed, as desired by an implementer, by either a pattern-matching algorithm or other non-cognitive method, or by a cognitive, self-learning, inferential, semantic-analytics, or other type of artificially intelligent technology. For example, a similarity analysis performed in an earlier step may have identified which elements of the two scripts are most dissimilar. In another example, if certain parameters or certain types of key nodes have been ranked by their relative significance for proper database operation, dissimilarities in parameters or types of key nodes deemed to be more significant would be given greater weight when attempting to determine which elements of input 505 are responsible for triggering the critical condition. In some embodiments, multiple similar scripts may be selected as being most likely to be "most similar. In such embodiments, dissimilarities that occur multiple times in the selected scripts could be given extra weight when determining which elements of input 505 were most likely to have caused the critical condition.

In the running example of the T1 and T2 scripts, one significant difference between the T2 sub-script and the T1 similar script is that the T1 script contains an ALTER TABLE command that may modify the data type of T1 database-table column b from CHAR(20) to VARCHAR (20). The failure script, including the T2 sub-script of the failure script, contains no such ALTER TABLE statement. In response to identifying this discrepancy a determination could be made that the lack of the ALTER TABLE statement is a cause of the critical condition and that an ALTER TABLE statement should be added to input 505 in order to rectify the problem by modifying T2 CHAR(10) column f to VARCHAR(20).

This determination may be made by any syntactic, cognitive, inferential, fuzzy-logic, or other type of analytical or decision-making algorithm. In some implementations, more than one such determination may be made, such as when it is determined that input 505 contains more than one potentially error-inducing inconsistency with one or more scripts selected as being similar. Some embodiments, in such cases, may then infer dependencies and relationships among the inconsistencies in order to more accurately infer semantic meaning from the similarity analysis and to more accurately identify revisions to input 505 capable of preventing the occurrence of future critical conditions.

In step 635, script generator 520 incorporates the corrections identified in step 625 into a revised version 525 of input 505. In the running example, this correction would comprise inserting an ALTER TABLE T2 statement between statements 1924 and 1933 of input 505. This new statement would modify the CHAR(10) data type of T2 column f to data type VARCHAR(20), much as the ALTER TABLE T1 statement of the selected most-similar script modified the data type of T1 column b from CHAR(20) to VARCHAR (20).

Step 640 determines whether the current embodiment requires manual confirmation or review of the corrected input 525. If so, a component of database system 500 forwards the revised input 525 to a human user or administrator, or to an automated component that performs a validation function, such as a syntax check or a cognitive code analysis.

In step 650, script generator 520 resubmits corrected input 525 to database system 500.

The improved database-management system may then monitor the result of the automatic correction and resubmission procedure of FIG. 6. If the corrected input 525 triggers the same or a different critical condition, the system may repeat the method of FIG. on the corrected input 525. But regardless of whether the corrections resolve the errors in input 505, certain embodiments will gather feedback about the corrections made to input 505 and the results, positive or negative, produced by resubmitting corrected input 525. This feedback may then be incorporated into a machine-learning procedure that is used to further train database system 500 to more accurately identify and correct input errors.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A database-management system (DBMS) comprising a processor, a memory coupled to the processor, and a computer-readable hardware storage device coupled to the processor, the storage device containing program code configured to be run by the processor via the memory to implement a method for self-learning database recovery, the method comprising:
   determining that an erroneous input submitted to the DBMS has caused the DBMS to enter a critical state;
   translating the erroneous input into a failure script that identifies key elements of each statement of the erroneous input;
   searching through a database log for a previously entered input that is most similar to the erroneous input, where a quantitative degree of similarity between the erroneous input and each input stored in the database log is determined as a function of a characteristic of the failure script;
   identifying one or more differences between the erroneous input and the most-similar previously entered input;
   correcting the erroneous input by revising the erroneous input to mitigate the differences between the erroneous input and the most-similar previously entered input; and
   resubmitting the corrected input.

2. The system of claim 1, further comprising:
   receiving feedback about the resubmission of the corrected input that indicates whether the corrected input caused a recurrence of the critical condition; and
   using the feedback to train the DBMS to more accurately correct future input errors.

3. The system of claim 1, further comprising:
   obtaining, before resubmitting the corrected input, authorization from a third party to resubmit the corrected input.

4. The system of claim 1, where the most-similar previously entered input has, at a previous time, been processed by the DBMS without causing the DBMS to enter the critical state.

5. The system of claim 1, where the translating a first statement of the erroneous input further comprises:
   extracting a set of tokens from the first statement by parsing the first statement; and
   inserting into the failure script one or more lines that comprise the extracted set of tokens.

6. The system of claim 1,
   where a first input stored in the database log is associated with a first corresponding script, and
   where the first corresponding script is derived from the first input by performing the translating upon the first input.

7. The system of claim 6, where a degree of similarity between the erroneous input and the first input is a function of a quantitative degree of similarity, determined by a computational method, between the failure script and the first corresponding script.

8. The system of claim 1, where the translating further comprises:
consolidating the failure script by cross-referencing each line of the failure script,
where the cross-referencing generates inferences by which the system interpolates information inferred from a first line of the failure script into a second line of the failure script.

9. The system of claim 1, where the erroneous input is one or more structured query language (SQL) statements.

10. A method for self-learning database recovery, the method comprising:
a database-management system (DBMS) determining that an erroneous input submitted to the DBMS has caused the DBMS to enter a critical state;
translating the erroneous input into a failure script that identifies key elements of each statement of the erroneous input;
searching through a database log for a previously entered input that is most similar to the erroneous input, where a quantitative degree of similarity between the erroneous input and each input stored in the database log is determined as a function of a characteristic of the failure script;
identifying one or more differences between the erroneous input and the most-similar previously entered input;
correcting the erroneous input by revising the erroneous input to mitigate the differences between the erroneous input and the most-similar previously entered input; and
resubmitting the corrected input.

11. The method of claim 10, where the translating a first statement of the erroneous input further comprises:
extracting a set of tokens from the first statement by parsing the first statement; and
inserting into the failure script one or more lines that comprise the extracted set of tokens,
where a first input stored in the database log is associated with a first corresponding script, and
where the first corresponding script is derived from the first input by performing the translating upon the first input.

12. The method of claim 11, where a degree of similarity between the erroneous input and the first input is a function of a quantitative degree of similarity, determined by a computational method, between the failure script and the first corresponding script.

13. The method of claim 10, where the translating further comprises:
consolidating the failure script by cross-referencing each line of the failure script,
where the cross-referencing generates inferences by which the system interpolates information inferred from a first line of the failure script into a second line of the failure script.

14. The method of claim 10, where the erroneous input is one or more structured query language (SQL) statements.

15. The method of claim 10, further comprising providing at least one support service for at least one of creating, integrating, hosting, maintaining, and deploying computer-readable program code in the computer system, wherein the computer-readable program code in combination with the computer system is configured to implement the determining, the translating, the searching, the identifying, the correcting, and the resubmitting.

16. A computer program product, comprising a computer-readable hardware storage device having a computer-readable program code stored therein, the program code configured to be executed by a database-management (DBMS) system comprising a processor, a memory coupled to the processor, and a computer-readable hardware storage device coupled to the processor, the storage device containing program code configured to be run by the processor via the memory to implement a method for self-learning database recovery, the method comprising:
a database-management system (DBMS) determining that an erroneous input submitted to the DBMS has caused the DBMS to enter a critical state;
translating the erroneous input into a failure script that identifies key elements of each statement of the erroneous input;
searching through a database log for a previously entered input that is most similar to the erroneous input, where a quantitative degree of similarity between the erroneous input and each input stored in the database log is determined as a function of a characteristic of the failure script;
identifying one or more differences between the erroneous input and the most-similar previously entered input;
correcting the erroneous input by revising the erroneous input to mitigate the differences between the erroneous input and the most-similar previously entered input; and
resubmitting the corrected input.

17. The computer program product of claim 16, where the translating a first statement of the erroneous input further comprises:
extracting a set of tokens from the first statement by parsing the first statement; and
inserting into the failure script one or more lines that comprise the extracted set of tokens,
where a first input stored in the database log is associated with a first corresponding script, and
where the first corresponding script is derived from the first input by performing the translating upon the first input.

18. The computer program product of claim 17, where a degree of similarity between the erroneous input and the first input is a function of a quantitative degree of similarity, determined by a computational method, between the failure script and the first corresponding script.

19. The computer program product of claim 16, where the translating further comprises:
consolidating the failure script by cross-referencing each line of the failure script,
where the cross-referencing generates inferences by which the system interpolates information inferred from a first line of the failure script into a second line of the failure script.

20. The computer program product of claim 16, where the erroneous input is one or more structured query language (SQL) statements.

* * * * *